United States Patent Office 3,814,701
Patented June 4, 1974

3,814,701
REGENERATION OF SPENT ALUMINA
Jhonce Nelson Browning, South Charleston, W. Va., assignor to FMC Corporation, New York, N.Y.
No Drawing. Filed Aug. 9, 1972, Ser. No. 279,117
Int. Cl. B01j 11/70, 11/72
U.S. Cl. 252—412                  3 Claims

ABSTRACT OF THE DISCLOSURE

A spent alumina that has been in contact with an anthraquinone working solution (made up of an anthraquinone working compound dissolved in one or more solvents) and which has been used to maintain the hydrogen peroxide productivity of the solution is regenerated by roasting the alumina at a temperature of about 300–400° C. until adsorbed organic matter has been removed, contacting the roasted alumina with an aqueous sodium hydroxide solution and roasting the caustic-treated alumina at about 300–400° C. until the alumina has been regenerated.

---

This invention relates to the regeneration of alumina which has been used to treat anthraquinone working solutions employed in the manufacture of hydrogen peroxide.

It is known that anthraquinone compounds, e.g. 2-ethylanthraquinone, and their tetrahydro derivatives can be used as working compounds in a process for producing hydrogen peroxide. In this process, commonly known as the anthraquinone process, the working compound is dissolved in a suitable solvent or solvent mixture and is alternately reduced and oxidized. During the reducing stage the working compound is hydrogenated in the presence of a catalyst to reduce it to its hydroquinone form. In the subsequent oxidation step the working compound is oxidized with air, oxygen or other oxygen containing gas to convert it to its quinone form with concomitant formation of hydrogen peroxide. The hydrogen peroxide produced is then removed from the working solution, preferably by extraction with water, and the remaining working solution is recycled to the hydrogenator to recommence the cyclic process for producing hydrogen peroxide. The detailed operation of this process is described fully in U.S. Pats. Nos. 2,158,525 and 2,215,883.

During cyclic hydrogenation and oxidation of the working solution in the above process, and particularly during the catalytic hydrogenation step, the anthraquinone working compound is gradually converted to degradation products that are unable to produce hydrogen peroxide. The rate of formation of these degradation products increases as the temperature of the working solution being hydrogenated and oxidized is elevated. Additionally, as the proportion of the working compound which is hydrogenated per pass through the system (also termed "depth of hydrogenation") is increased, the amount of degradation products also rises sharply.

During the cyclic processing, these anthraquinone working compounds also undergo hydrogenation of other than the quinone group during the catalytic hydrogenation step. This results in the gradual formation of corresponding tetrahydroanthraquinone derivatives of the working compounds. These compounds, unlike the degradation products discussed above, will produce hydrogen peroxide upon cyclic reduction and oxidation in the same manner as the original anthraquinone working compound. Accordingly, the term "degradation products" as used herein does not apply to tetrahydro derivatives of the anthraquinone working compound.

In U.S. Pat. No. 2,739,875, issued to Jerome W. Sprauer on Mar. 27, 1956, there is described a process for treating an anthraquinone working solution containing degradation products whereby the solution can be regenerated to restore its hydrogen peroxide synthesizing capacity. In accordance with this process. the anthraquinone working solution is heated in the presence of either activated alumina or activated magnesia, thereby regenerating its hydrogen peroxide synthesizing capacity.

While this process has been found to be useful and effective in regenerating working solutions, after repeated cycling of the working solution through the activated alumina, the alumina loses activity and fails to maintain the hydrogen peroxide productivity of the working solution.

As a result, there is a need for a method of regenerating the alumina used to treat anthraquinone working solutions whereby the regenerated alumina can be reused to restore effective hydrogen peroxide synthesizing capacity of the solutions.

It has now been found that alumina which has been in contact with an anthraquinone working solution and has been used to maintain the hydrogen peroxide productivity of the solution during cyclic hydrogenation and oxidation of it, can be regenerated by roasting the alumina at about 300–400° C. until the adsorbed organic and carbonaceous matter thereon has been removed, contacting the roasted alumina with $Na_2O$ values contained in an aqueous sodium hydroxide solution, and again roasting the caustic-treated alumina at about 300–400° C. until the reaction of remaining $Na_2O$ values and the alumina are complete, whereby regeneration of the alumina is effected.

The alumina which is treated in accordance with the present invention refers to any activated alumina obtained from natural or synthetic hydrated alumina whether or not it contains minor proportions of silica or other materials and which is dehydrated by heating so as to convert the alumina to a less hydrated form, such as alpha-alumina monohydrate or gamma-alumina monohydrate, without going to corundum, which is inactive. The alumina is activated by heating it to temperatures in the range of 300–800° C. in order to convert it to a micro-porous alumina having an extensive surface area.

Conventionally alumina is used to treat anthraquinone working solutions which have been subjected to repeated cycles of catalytic hydrogenation and oxidation to produce hydrogen peroxide. The working solutions which come in contact with the alumina are those that contain an anthraquinone working compound, such as 2-ethylanthraquinone or the 2-isopropyl, 2-sec-butyl-, 2,5-butyl-, 2-sec-amyl-, 2-methyl- or 1,3-dimethyl-derivatives of anthraquinone as well as other anthraquinones which are known in the hydrogen peroxide art. These working compounds are dissolved in at least one solvent to form the anthraquinone working solutions; two or more mixed solvents may be used to enhance the solubility of the anthraquinone working compound in both its hydrogenated form, i.e. the hydroquinone form, and its oxidized form, i.e. the quinone form.

The degradation products which are unable to produce hydrogen peroxide form in the anthraquinone working solution during the chemical reactions that take place in the catalytic hydrogenation step and in the oxidation of the working solution as it is circulated in a cyclic system to produce hydrogen peroxide. The alumina is used to absorb undesired compounds and also to revert such degradation products to useable, active anthraquinone compounds which can produce hydrogen peroxide.

The effectiveness of the alumina treatment can be evaluated by analyzing the anthraquinone working solution for ethylanthraquinone and tetrahydroanthraquinone, both of which produce hydrogen peroxide upon cyclic reduction and oxidation. In addition, the anthraquinone working solution is also analyzed for its epoxide value. The epoxide is a degradation product of the tetrahydroquinone derivative; that is, it has an oxygen atom attached to two vicinal carbon atoms of the tetrahydroanthraquinone. Since the epoxide does not produce hydrogen peroxide upon cyclic reduction and oxidation in the anthraquinone working solution, it should be converted to useable anthraquinone compounds by the alumina treatment.

In practice, the alumina treatment is carried out by passing the anthraquinone working solution through an alumina bed at a rate sufficient to achieve the desired regeneration. The alumina bed can be located downstream from the hydrogenator so that hydrogenated forms of the working solution (hydro form) can be treated in the alumina bed. Alternately, the alumina treatment can take place after the working solution has been passed through the oxidizer so that the working solution is in the oxidized (neutral form) state. While we prefer to regenerate the alumina which has been used to treat the hydro form of the working solution, that is, after the hydrogenator, the present invention is equally applicable to regenerating alumina which has been used to treat neutral working solutions, that is, after the oxidation stage.

In the practice of the present invention, the spent alumina is treated initially by a roasting step. The roasting step can be carried out at any temperature of from about 300° C. to about 400° C., with temperatures around 400° C. being preferred. The lower temperatures of the above range require extended heating while temperatures of around 400° C. are effective in about 4 hours. The heating is carried out until the alumina is free of adsorbed carbonaceous and organic matter. Temperatures higher than 400° C., e.g. higher than 450° C., are undesired because they could cause detrimental crystalline structure changes in the alumina.

This initial roasting stage can be carried out in any equipment provided that air or any oxygen-containing gas is present to aid in oxidizing the organic and carbonaceous matter. This initial roasting step frees the microscopic void spaces within the alumina of adsorbed organic and carbonaceous matter and exposes the interstitial surface of the crystals for the subsequent treatment of the instant invention. In practice, it has been found that the roasting period should be continued until the alumina is essentially free of dark colors. At this point the carbonaceous and organic impurities are essentially removed by the roasting step.

In the second stage of the instant process the roasted alumina, after cooling, is treated with a sodium hydroxide solution. The concentration of the aqueous sodium hydroxide solution used to treat the roasted alumina is not critical and amounts of from 0.5 to 5% are convenient to work with. It is prefered to use a concentration of about 1.5 weight percent of sodium hydroxide. The alumina is contacted with the sodium hydroxide solution preferably by immersing the alumina in the solution. Alternately, the solution can be passed over the alumina so that it thoroughly wets the entire surface and penetrates the pores of the alumina surface.

During this treatment with the sodium hydroxide solution a small temperature rise in the solution, e.g. about 25° C., is normal. During this treatment, some sodium hydroxide is preferentially adsorbed and/or reacted with the alumina since the drained solution contains a lower percentage of sodium hydroxide than the fresh solution contacting the alumina.

The treated alumina is separated from the caustic solution and contains residual $Na_2O$ values from the caustic solution. The term "$Na_2O$ values" is utilized because upon removal of water this is the conventional way of expressing sodium values on the residual alumina. The treated alumina, after draining of excess sodium hydroxide solution and containing residual $Na_2O$ values, is then treated to an additional roasting stage in which the alumina is heated to temperatures of about 300° C. to about 400° C. in the presence of air or an oxygen-containing gas. This roasting stage preferably is carried out by gradually heating the alumina to remove all of the excess water at temperatures less than 100° C., and thereafter, increasing the temperature to the range of 300–400° C., and preferably 400° C., where it is maintained until the reaction of the residual $Na_2O$ values and the alumina are completed. This normally requires on the order of about 2 hours. The reaction of the $Na_2O$ values with the alumina is considered to be a fixing of the $Na_2O$ on the internal and external surfaces of the alumina. Thereafter, the cooled, regenerated alumina can be reused exactly like a new product to treat anthraquinone working solutions.

The following examples are given to illustrate the invention, but are not deemed to be limiting thereof.

EXAMPLE 1

The following runs were made by totally recycling an anthraquinone working solution through a vertical bed of alumina. The effectiveness of the alumina is measured by its ability to maintain useable anthraquinone derivatives at a high level.

An anthraquinone working solution was made up by mixing together 25% by volume of tris(2-ethylhexylphosphate) and 75% by volume of a commercially available, mixed aromatic solvent containing about 99.6% aromatics, having a boiling point range of 182° C. to 204° C. obtained from Shell Chemical Company and identified as Cyclosol 63®; it had an aromatic content of about 82.3% $C_8$–$C_{12}$ alkylbenzene, 80% of which is $C_{10}$–$C_{11}$ alkylbenzene, 13.3% cycloalkylbenzene and 3.5% $C_{10}$ diaromatic (naphthalene). Thereafter, 2-ethylanthraquinone was dissolved in the mixed solvent in amounts of 11 to 12%.

A fixed bed of alumina for treating the anthraquinone working solution, described above, was prepared as follows. A 1-inch diameter Pyrex glass column, 18 inches long, was closed at each end with stainless steel end plates. The end plates were adapted to accommodate one-quarter inch Teflon tubing and a suitable drain valve. The outlet port of the cycling pump, which was calibrated to transfer 30 ml./min., was connected to the bottom of the vertical column. The inlet port of the pump was connected to a stirred 500 ml. Pyrex reservoir. The reservoir, which was vented through a water-cooled condenser, was in turn connected to the top of the one-inch column. The column was heated with a Variac controlled heating tape.

All runs were performed using 300 ml. of the above-identified work solution in the reservoir and 40 g. of the alumina under test, which was held in place in the one-inch diameter column with layers of support glass beads above and below the alumina to hold it in position. A thermometer was placed in the column near the side extending into the alumina. Cycling of the work solution was conducted at 70° C. for 20 hours under a nitrogen atmosphere for the solution which was in the hydro form, that is, previously passed through a hydrogenator, but not an oxidizer. The resulting solution was analyzed polarographically for tetraethylanthraquinone (TEAQ), ethylanthraquinone (EAQ) and the epoxide of the tetraethylanthraquinone (epoxide).

In the present example two runs were made, one with regenerated alumina in accordance with this invention and in the second run with alumina which was exhausted from prior use. The regenerated alumina was prepared by taking about 200 g. of an exhausted (spent) alumina, placing it in a porcelain dish and roasting it in a muffle furnace at 400° C. for about 4 hours. Inspection of the roasted alumina indicated that it was free of carbonaceous and organic matter. The roasted alumina was then cooled and placed in a 16-inch section of a Pyrex glass pipe having stainless steel plates on the bottom which was fitted with a closed valve. A solution of 1.5 weight percent sodium hydroxide in water was poured over the alumina until the aqueous layer was just above the alumina level. After addition of the sodium hydroxide solution a rise in temperature of about 25° C. occurred. Thereafter, the valve was opened and the excess sodium hydroxide solution was drained and analyzed. It was found that the drained solution contained only 0.7 weight percent of sodium hydroxide. If desired, the drained sodium hydroxide solution can be reconstituted and re-used for additional treatment of other batches of alumina.

After allowing the alumina to drain, it was transferred to a porcelain dish and once again placed in a muffle furnace and heated to just less than 100° C. until all of the water in the remaining aqueous sodium hydroxide solution evaporated. Thereafter, the temperature was increased to 400° C. and maintained for 2 hours. During this latter stage the residual $Na_2O$ values, remaining from the sodium hydroxide solution, are permitted to react with the alumina so that they are "fixed" on the external and internal surfaces of the alumina. The regenerated alumina was then cooled and placed in the previously described alumina column. The results of using this regenerated alumina to treat working solution is reported in Table I, as weight percent of TEAQ, EAQ and epoxide in the working solution.

The second, or comparative, run was also carried out using a similar work solution but the alumina treatment was carried out with spent alumina, without regeneration, to show the comparison between the spent alumina and the regenerated alumina. These results are set forth in Table A.

TABLE I

|  | Untreated solution (wt. percent) | Treated with regenerated alumina (wt. percent) |
|---|---|---|
| TEAQ | 10.1 | 9.6 |
| EAQ | 0.4 | 1.6 |
| Epoxide | 1.0 | 0.1 |

TABLE A

|  | Untreated work solution | Treated with exhausted alumina |
|---|---|---|
| TEAQ | 8.7 | 9.0 |
| EAQ | 1.3 | 1.3 |
| Epoxide | 1.3 | 1.2 |

As is shown in Table I, the combined amount of useable anthraquinone compounds, namely, TEAQ and EAQ, was increased by treatment with the regenerated alumina. In addition, the amount of epoxide, which is not useable in the work solution, was substantially reduced. By comparison, in Table A, the exhausted alumina did not increase materially the TEAQ and EAQ levels, and most importantly it did not reduce the epoxide levels in the work solution to nearly the same extent as the regenerated alumina.

EXAMPLE 2

The procedure of Example 1 was repeated except that the working solution was in an oxidized (neutral form) state, rather than in a hydrogenated state. The runs were carried out under an air atmosphere instead of a nitrogen atmosphere and cycling of the working solution was conducted at 83° C. for 20 hours. The alumina was regenerated as set forth in Example 1. The results are set forth below.

TABLE II

|  | Untreated working solution | Treated with regenerated alumina |
|---|---|---|
| TEAQ | 10.1 | 10.5 |
| EAQ | 0.4 | 0.6 |
| Epoxide | 1.0 | 0.0 |

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. A method for regenerating spent alumina which has been in contact with an anthraquinone working solution and has been used to maintain the hydrogen peroxide-productivity thereof during cyclic hydrogenation and oxidation of said anthraquinone working solution, said working solution containing an anthraquinone compound dissolved in at least one solvent, comprising roasting the spent alumina at from about 300° C. to about 400° C. until adsorbed organic and carbonaceous matter has been removed, contacting the roasted alumina with $Na_2O$ values contained in an aqueous sodium hydroxide solution, roasting the caustic-treated alumina at about 300° C. to about 400° C. until the reaction of residual $Na_2O$ values and the alumina are complete, and recovering a regenerated alumina suitable for maintaining the hydrogen peroxide productivity of an anthraquinone working solution.

2. Process of claim 1 wherein the aqueous sodium hydroxide solution has a concentration of from 0.5 to 5%.

3. Process of claim 1 where the initial roasting is carried out at about 400° C. for about 4 hours and the re-roasting is carried out at a temperature of about 400° C. for about 2 hours.

References Cited

UNITED STATES PATENTS

| 2,739,875 | 3/1956 | Sprauer | 423—590 |
| 3,307,909 | 3/1967 | Reilly | 423—590 |
| 3,329,727 | 7/1967 | Louvar | 252—463 |
| 2,824,881 | 2/1958 | Wettstein | 252—416 |
| 3,432,267 | 3/1969 | Lee et al. | 423—588 |

FOREIGN PATENTS

| 635,870 | 2/1962 | Canada | 252—416 |

DANIEL E. WYMAN, Primary Examiner

P. E. KONOPKA, Assistant Examiner

U.S. Cl. X.R.

252—416; 423—111, 688